United States Patent [19]

Willemin

[11] 4,210,039
[45] Jul. 1, 1980

[54] APPARATUS FOR FORMING NON-CIRCULAR WORKPIECES

[75] Inventor: Paul Willemin, Bassecourt, Switzerland

[73] Assignee: Willemin Machines S.A., Canton of Berne, Switzerland

[21] Appl. No.: 949,508

[22] Filed: Oct. 10, 1978

Related U.S. Application Data

[63] Continuation-in-part of Ser. No. 776,440, Mar. 11, 1977, abandoned.

[30] Foreign Application Priority Data

Mar. 11, 1976 [CH] Switzerland .................. 3025/76

[51] Int. Cl.² .................. B23B 3/28; B24B 5/00; B24B 7/00
[52] U.S. Cl. .................. 82/18; 51/97 NC; 51/101 R
[58] Field of Search .................. 82/18, 19; 51/97 NC, 51/105 EC, 101 R, 145 R

[56] References Cited

U.S. PATENT DOCUMENTS

| | | | |
|---|---|---|---|
| 2,762,250 | 9/1956 | Awman et al. | 82/18 |
| 2,836,936 | 6/1958 | Lovely | 82/18 |
| 3,066,560 | 12/1962 | Estephanio | 82/18 |
| 3,375,613 | 4/1968 | Boucher | 51/101 R |
| 3,595,108 | 7/1971 | Priscal | 82/18 |
| 3,800,621 | 4/1974 | Hoglund | 51/101 R |
| 3,861,275 | 1/1975 | Mueller | 51/101 R |
| 3,978,766 | 9/1976 | Brennan, Jr. et al. | 82/18 |
| 4,052,928 | 10/1977 | Pierrat et al. | 51/97 NC |

Primary Examiner—Harrison L. Hinson
Attorney, Agent, or Firm—Silverman, Cass & Singer, Ltd.

[57] ABSTRACT

An apparatus for forming non-circular workpieces including a rotatable workpiece carrying element which is laterally displaceable as it rotates to form the desired non-circular workpiece profile. The workpiece carrying element has three cam surfaces at least two of which have a non-circular profile, each bearing against fixed roller bearings to guide the workpiece against a fixed cutting surface to form the desired workpiece profile. The apparatus also is utilized to form at least the two non-circular profile cam surfaces.

5 Claims, 10 Drawing Figures

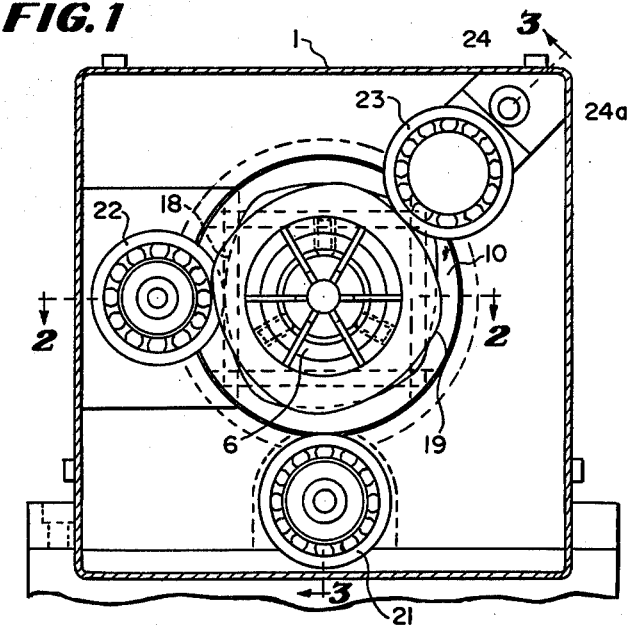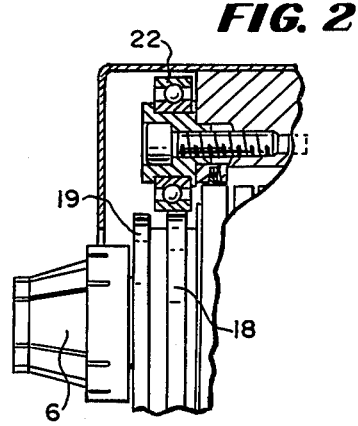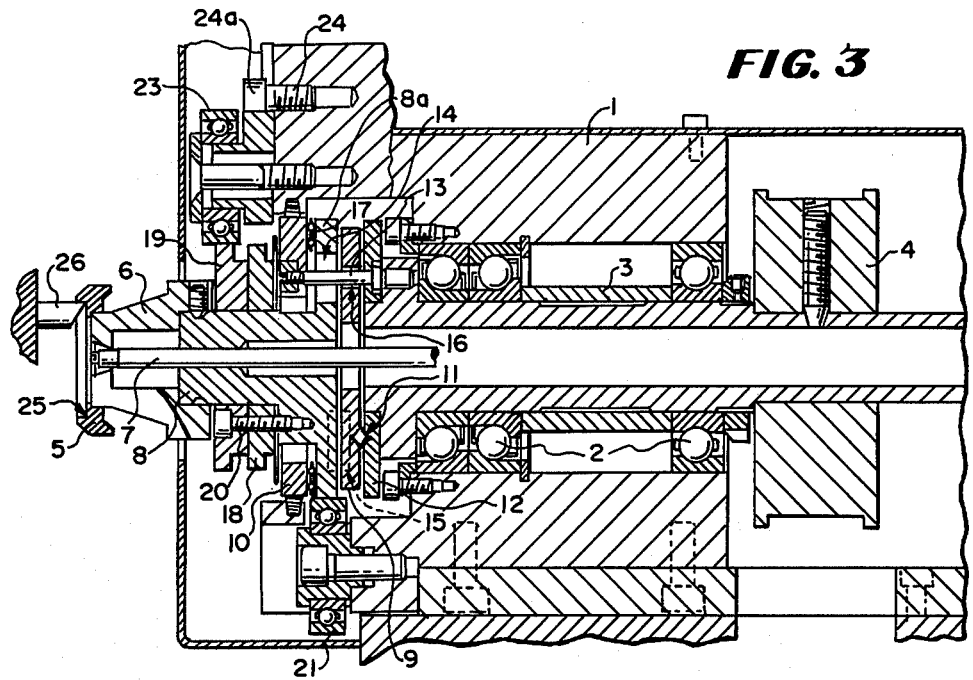

APPARATUS FOR FORMING NON-CIRCULAR WORKPIECES

CROSS-REFERENCE TO RELATED APPLICATION

This is a continuation-in-part of application Ser. No. 776,440, filed Mar. 11, 1977, now abandoned.

BACKGROUND OF THE INVENTION

The invention relates to an apparatus for forming non-circular surfaces on workpieces and more particularly to an apparatus having a workpiece carrying element on which is secured the workpiece and which is driven in rotation while being able to move laterally in all directions with respect to its axis of rotation to form the desired workpiece profile.

The apparatus includes the workpiece carrying element which is maintained in contact, by means of three cams, with three roller bearings the axes of which are stationary to the operation of the rotating carrying element. At least two of the cams have a non-circular profile each of which is maintained, during the rotation of the workpiece carrying element, in contact with its respective roller bearing to guide the lateral or translational movement of the workpiece as it rotates. The workpiece is in contact with a fixed cutting tool which acts thereon as it is rotated and translated to cause the tool to cut the desired non-circular surface on the workpiece.

The apparatus also is utilized with one of the three cams having a circular profile for making one or both of the other two non-circular profile cams.

SUMMARY OF THE INVENTION

The present invention provides an apparatus for making non-circular surfaces on workpieces, which apparatus has at least two non-circular profile cams and which apparatus also may be utilized to form the non-circular profile cams for a predetermined desired workpiece profile. The apparatus includes a workpiece carrying element which includes three cams each bearing against a fixed support roller. In operation, one cam is circular while the other two cams have a non-circular profile such that a workpiece secured to the workpiece carrying element is driven laterally in the desired profile as it is rotated against a fixed cutting tool to form the desired non-circular surface on the workpiece. To form the two non-circular cam surfaces for a particular desired workpiece profile, one cam is replaced by a oversized cam member to be formed into a non-circular profile shaping cam. The second non-circular profile cam is replaced by a circular member while the shaping cam is being formed. The roller for the shaping cam is replaced by a grinding wheel or abrasive strip which is driven against the oversized member. The stationary cutting tool is replaced by a stationary guide which is guided on a template surface having a reverse or inside out complementary shape to the desired workpiece profile. The apparatus is then operated to rotate the carrying element and the biased abrasive strip or cutter cuts the oversize member until the template has come into constant contact with the guide which forms the proper profile shaping cam. Once the shaping cam is fabricated a second complementary cam is then fabricated, but without the template and guide. The shaping cam roller is replaced and The circular cam is replaced by an oversize cam member. The second roller is also replaced by an abrasive strip or grinder biased to cut away the member until it also has the proper profile with each of the other cams now in constant contact with their respective rollers. The shaping and complementary cams now are shaped to provide the desired workpiece profiles on the apparatus.

BRIEF DESCRIPTION OF THE DRAWINGS

FIG. 1 is a front elevational view of the workpiece forming apparatus;

FIG. 2 is a sectional side view of the forming apparatus taken along the line 2—2 of FIG. 1;

FIG. 3 is a sectional side view of the forming apparatus taken along the line 3—3 of FIG. 1;

DESCRIPTION OF THE PREFERRED EMBODIMENTS

Figure 4:
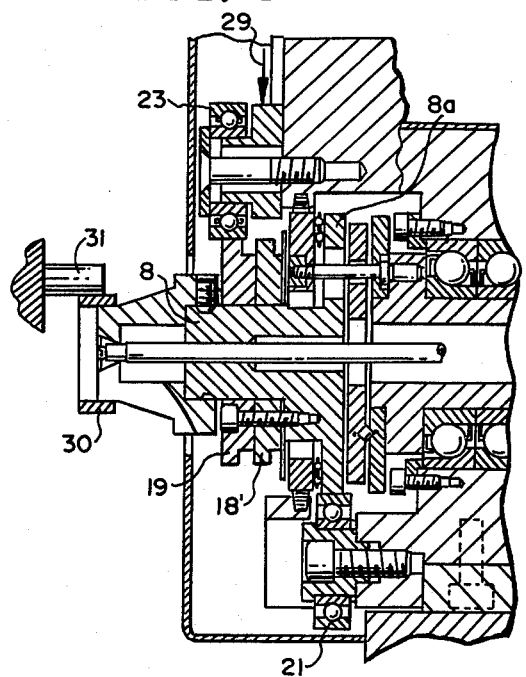
FIG. 4 is a partial sectional side view similar to that of FIG. 3 illustrating forming the shaping cam.

As indicated above, the invention is concerned both with an apparatus for forming a non-circular profile on workpieces mounted on a rotating workpiece carrying element guided by three cam surfaces and the formation of the profiled cam surfaces to form a particular desired non-circular workpiece profile.

Referring now to FIGS. 1 through 3, the workpiece forming apparatus of the invention is designated generally at 100. The forming apparatus 100 includes a head stock 1 in which a quill 3 is rotatably mounted, by means of a plurality of roller bearings 2. The quill 3 includes a pulley 4 fixedly mounted thereto which may be driven by a belt and motor (not illustrated). A workpiece 5 to have a non-circular profile formed thereon is removably secured on a chuck 6 by a gripping rod 7 traversing the quill 3. The chuck 6 is mounted at one end of a workpiece carrying element or sleeve 8 which has formed on its opposite end, a flange 8a having a circular profiled surface.

The flange 8a of the element 8 is secured between a pair of rings 9 and 10. The ring 9 is maintained angularly rigid by means of a plurality of rollers 11 (only one of which is shown) with a flange 12 fixedly engaged on a front end of the quill 3. The second ring 10 is maintained in engagement with the flange 8a by four stay-rods 13 (one of which is visible in FIG. 3) which maintain the ring 10 angularly rigid with the quill 3. The stay-rods 13 pass through the flange 8a through circular openings 14, which openings have a larger diameter than the outer diameter of the rods, so that the rods pass therethrough with lateral clearance therefrom. The flange 8a is maintained angularly rigid with the ring 9 by a plurality of rollers 15 (only one of which is shown).

The ring 9 and the flange 12 have a plurality of V-shaped grooves on their adjacent surfaces for receiving the rollers 11 which are perpendicular to the plane of FIG. 3 of the drawing, which permits the ring 9 to move laterally in one direction. The ring 9 has a plurality of openings 16 through which the stay-rods 13 pass, each of which openings 16 is elongated in the direction perpendicular to the plane of FIG. 3. The flange 8a and the ring 9 have a plurality of grooves (not numbered) in their adjacent surfaces to maintain the rollers 15, which grooves are parallel to the plane of FIG. 3. The rollers 15 and grooves allow the flange 8a to move perpendicular to the direction of the movement of the ring 9 with respect to the flange 12.

The arrangement of the rings 9 and 10, flanges 8a and 12 and the openings and rollers provided therein, form a cross-shaped slide way for the workpiece carrying element 8. The slide way allows the workpiece carrying element or sleeve 8 a degree of movement in all lateral directions while it is being rigidly rotated with the quill 3. The ring 10 and the flange 8a include an abutting bearing 17 interposed therebetween, against which the stay-rods 13 are axially tightened.

Figure 6:
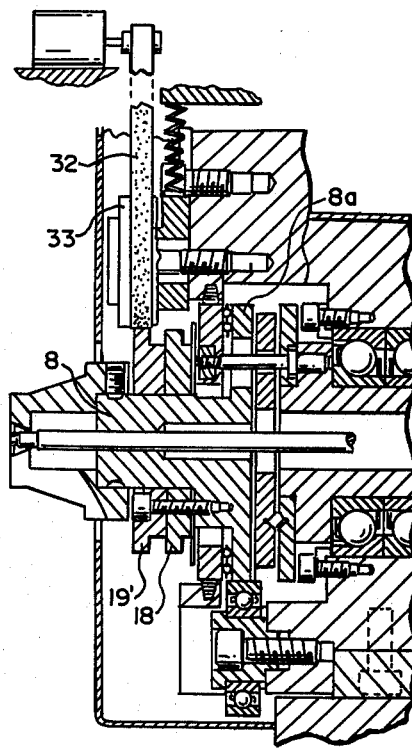
FIG. 6 is a partial sectional side view similar to that of FIG. 3 illustrating forming the complementary cam.
Figure 7A:
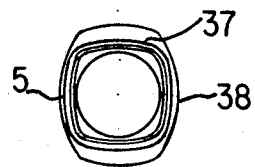
FIGS. 7A–7D are plan views of one desired workpiece to be formed, and the profile of the three cams utilized to form the desired workpiece.
Figure 7B:
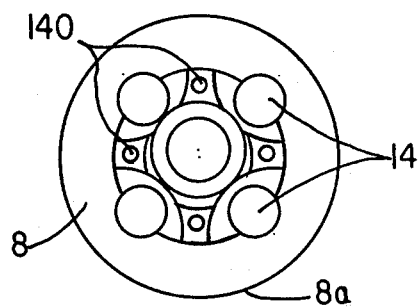

The sleeve 8 also carries a pair of interchangeable profiled cams 18 and 19 which are secured to the sleeve or workpiece carrying element 8 by four screws 20 screwed in holes 140 of this element 8 (FIG. 3 and 7B). The non-circular profile of the cams 18 and 19 may be formed on the forming apparatus 100 as discussed with respect to the FIGS. 4-6. The profiles of the cams 18 and 19 are somewhat exaggerated in FIG. 1 to illustrate their non-circular profiles. FIGS. 7A-7D illustrate, however, substantially the exact profile of a particular workpiece 5 to be formed and the circular cam profile 8a and the profiled cams 18 and 19 to form the workpiece 5 non-circular surface.

The non-circular profile of the two cams 18 and 19 and of the cam or bearing surface formed by the flange 8a of the sleeve 8, as well as their relative position, are such that during the rotation of the quill 3, each of the three cams constantly will remain in contact with respective fixed rollers 21, 22 and 23. Each of the rollers 21, 22 and 23 are rotatably mounted in a fixed position on the front face of the head stock 1. The three rollers are radially fixed during operation of the workpiece forming apparatus 100, but the radial position of the roller 23 is adjustable by means of an eccentric head 24a of a screw 24 to permit for compensation of manufacturing tolerances and wear of the apparatus.

The forming of a non-circular surface such as, for example, a surface 25 of the workpiece 5 is obtained by rotating the workpiece on the chuck 6 against a stationary cutter 26. The workpiece 5 is rotated on the chuck 6 by means of the pulley 4 rotating the quill 3 and the proper radial displacement of the workpiece surface 25 is effected by the cam surfaces 8a, 18 and 19 rotating against their fixed rollers 21-23, which determine at each angular position of the quill 3 a given radial position for the sleeve 8 and consequently for the workpiece 5. The stationary cutting tool or cutter 26 could be replaced by a grinding wheel or by a milling cutter, if desired.

In operation the workpiece forming apparatus 100 is rotated by the drive pulley 4 on the rotating quill 3. The spindle 8 is rotatably keyed through the drive pins 13, but is allowed to flow relative to the rotational axis of the quill 3 because of the rollers 11 and 15 keyed between the flange 8a, ring 9 and flange 12. Thus the spindle 8 will shift or rock due to the profile of the cams 18 and 19 as the quill 3 rotates. The lateral movement of the spindle 8 is the equivalent of a rocking movement around an axis parallel to the axis of the spindle 8 passing through the contact point between the element or cam 8a and the roller 21. In other words, if the spindle 8 was not rotating on itself, the bearing of the cam 8a against the roller 21 could be replaced by an articulation of the spindle on a shaft the axis of which would pass through the contact point between the cam 8a and the roller bearing 21. In this rocking or shifting movement, it should be noted that there is a very slight lateral movement of the contact point between the cam 8a and the roller 21, but such movement is substantially insignificant.

The cam 18 bearing against the roller 22 is a shaping cam which maintains the proper lateral position of the spindle 8 as it rotates, which determines the shape of the non-circular surface formed. The cam 19 is a complementary cam which maintains the cam 18 bearing continuously against its roller 22. The mechanical equivalent of the cam 19 is essentially a spring biased against the spindle 8 for urging the cam 18 against the roller 22. The shape of the cam 19 is a direct function of the shape of the cam 18 and is such that whatever the lateral position of the spindle 8 may be, the cam surface 8a is in contact with roller 21 and the shaping cam 18 is in contact with its roller 22. The complementary cam 19 is also in contact with its roller 23.

Attempts have been made to determine theoretically the shape of the cam 18 for a particular non-circular workpiece profile. Some attempts at mathmetically calculating the shape of the cam 18 have been attempted by computerized analysis, but have not yet succeeded. Therefore, at this time the only practical way of manufacturing cam 18 is on the workpiece forming apparatus 100 itself. Although the mathmetical analysis of the shaping process has not yet been fruitful, the cams 18 and 19 which are formed on the workpiece forming apparatus 100 operate in the desired manner.

One such set of cams is shown in FIGS. 7A-7D which were formed in the matter set forth hereinafter in describing FIGS. 4-6. In this respect the cams 18 and 19 are formed on the apparatus 100' as described starting with FIG. 4.

Figure 5:
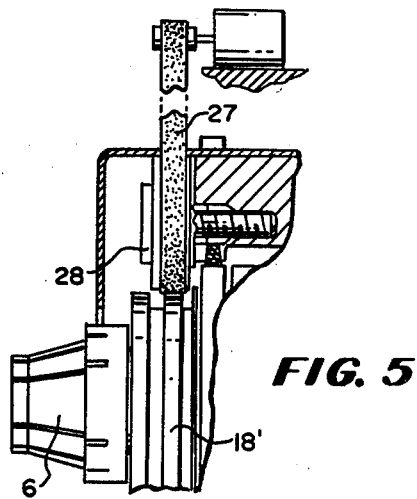
FIG. 5 is a partial sectional side view similar to that of FIG. 2 further illustrating forming the shaping cam of FIG. 4.

To make the shaping cam 18, cam 18 is replaced on the sleeve 8 by a rough or unformed member 18' (FIG. 4) and the roller 22 will be replaced by an abrasive strap 27 rotating on a roller 28 located in place of the roller 22 (FIG. 5). The diameter of the roller 28 will be slightly less than that of the roller 22 to compensate for the thickness of the abrasive strap 27. The cam 19 will be replaced by a circular cam 19'. The roller 23 will be released so that it is a radially moveable roller 23' and the screw 24 will be replaced by means (not shown), which may be a lever submitted to the action of a spring carrying a roller which bear against the roller 23', to exert a radial pressure, as shown by the arrow 29 (FIG. 4), against the moveable roller 23' to maintain it against the circular cam 19'.

The workpiece 5 will be replaced by a template 30 which represents the negative complementary or in side out shape of the surface 25 to be cut and the cutting tool 26 will be replaced by a stationary cam or template follower 31.

The cam 18 is then formed from the rough cam 18' by operating the workpiece forming apparatus 100' while applying pressure on the roller 23' as shown by the arrow 29. This maintains the cam 8a in contact with its roller 21 and the unformed or rough member 18' is contact with the abrasive strip 27 which may be driven by a motor 34 to abraid or cut away the rough surface of the cam 18' until the template 30 bears continuously on the follower 31 throughout the entire rotation of the sleeve 8 resulting in the finished cam 18.

The workpiece forming apparatus 100' also may be utilized to make the cam 19. As best illustrated in FIG. 6, the roller 22 (not shown) along with the formed cam 18 again will be mounted on the apparatus 100'. The circular cam 19' will be replaced by a rough or unformed cam member 19". The template 30 and the follower 31 will be eliminated or otherwise made inoperable. The roller 23 will be replaced by an abrasive strap 32 rotating on a roller 33 of a diameter slightly less than roller 23 to compensate for the thickness of the abrasive strap 32, as previously described for the roller 28. A second motor 35 may be utilized to drive the abrasive strap 32, which may be an electric motor identical to motor 34 or may be motor 34 with another coupling or gearing to accommodate the slightly offset position of the strap 32 from the strap 27. The abrasive straps 27 and 32 could also be replaced by grinding wheels if desired. The roller 33 will be biased against the rough cam member 19" by spring 36 or other equivalent means. The workpiece forming apparatus 100' is then operated as before until the abrasive strap 32 has cut away the surface of the rough member 19" such that the axis of the roller 33 is moved into the position corresponding concentrically to the center axis of the roller 23. The roller 23 is then replaced on the finished cam 19 and the workpiece forming apparatus 100 then may be utilized to cut the desired non-circular profiles on a sequence of workpieces 5, as previously described.

Figure 7C:
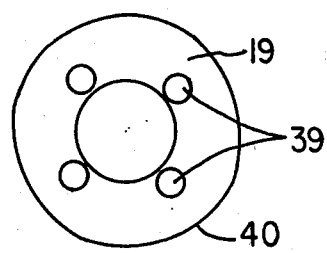
Figure 7D:
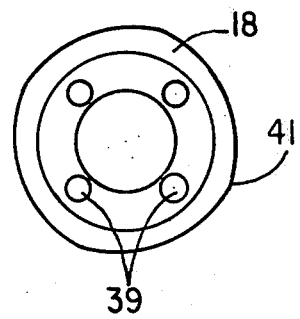

Referring now to FIGS. 7A-7D, FIG. 7A illustrates one specific workpiece 5 having a pair of non-circular surfaces 37 and 38, one or both of which may be formed utilizing the forming apparatus 100'. FIGS. 7B, 7C and 7D show the specific cam formations to form the surface 37 of the workpiece.

FIG. 7B illustrates the spindle 8 having the circular cam profile 8a and the four openings 14. The shaping cam 18 and complementary cam 19 are illustrated in FIGS. 7D and 7C, respectively; however, these are interchangeable as noted above. The screws 20 pass through the holes 39. The complementary cam 19 has an outer irregular profile 40, while the shaping cam 18 has an outer irregular profile 41. As also mentioned above, the only known method for forming the profiles 40 and 41 on the cams 19 and 18 for a desired workpiece surface is on the apparatus 100'.

Modifications and variations of the present invention are possible in light of the above teachings. It is, therefore, to be understood that within the scope of the appended claims, the invention may be practiced otherwise then as specifically described.

What is claimed and desired to be secured by Letters Patent of the United States is:

1. An apparatus for forming a non-circular workpiece surface comprising:
   a workpiece;
   workpiece cutting means;
   a rotatable workpiece carrying element, said workpiece mounted on said carrying element, and said carrying element and workpiece being laterally displaceable as said carrying element rotates;
   said workpiece carrying element including at least a first cam surface thereon bearing against a fixed roller bearing as said carrying element rotates;
   said carrying element further including shaping cam means; and
   biasing means for biasing said shaping cam means against a fixed point as said carrying element rotates to guide said workpiece against said cutting means and laterally shift said workpiece and carrying element as they rotate to form a non-circular surface on said workpiece.

2. The forming apparatus as claimed in claim 1 wherein:
   said shaping cam means includes a shaping cam mounted on said carrying element spaced from said first cam surface, said shaping cam including a profiled cam surface to guide the lateral displacement of said carrying element and workpiece as they rotate;
   said biasing means including a complementary cam mounted on said carrying element, said complementary cam including a second profiled cam surface bearing against a second fixed roller bearing; and
   said fixed point against which said shaping cam profiled surface is biased against being formed by the surface of a third fixed roller bearing.

3. The forming apparatus as claimed in claim 1 including:
   said workpiece carrying element angularly fixed to a rotatably driven quill;
   said first cam surface being formed on the periphery of a flange formed on said workpiece carrying element adjacent said quill, and said carrying element including a sleeve extending axially from said flange away from said quill, said workpiece being mounted on said sleeve;
   said flange being fixed to said quill by a ring surrounding said sleeve and bearing against said flange by stay rods fixed to said ring and quill through said flange; and
   said ring being spaced from said flange by bearing means, said rods passing through openings larger than said rods to allow said workpiece carrying element to be radially displaced with respect to said quill as said quill and workpiece carrying element are rotated.

4. A method of forming a cam profile on an apparatus for forming non-circular workpiece surfaces, said apparatus including a rotatable workpiece carrying element adapted to carry a workpiece having a surface to be worked upon against a cutting tool position, said carrying element being laterally displaced in a predetermined fashion as it rotates to form a non-circular profile on said workpiece, said carrying element including a first circular cam surface formed on a flange of said carrying element and a second shaping cam mounted on a sleeve of said carrying element having a non-circular profile, and means for biasing said cams against respective fixed roller bearings as said carrying element rotates to guide said lateral displacement of said carrying element, said method comprising:
   mounting a rough or unfinished cam member in place of said shaping cam on said sleeve;
   replacing said shaping cam roller bearing with cutting means having a cutting position corresponding to the contact position between said shaping cam and its roller bearing;
   mounting template means on said carrying element in place of said workpiece, said template means having an outer surface corresponding to the inner surface profile of the desired non-circular surface to be formed;

mounting template follower means in said cutting tool position to bear against said template means outer surface; and rotating said carrying element until said template means is in continuous contact with said template follower means to finish said shaping cam surface.

5. The method of forming as claimed in claim 4, wherein said biasing means include a third complementary cam mounted on said sleeve and bearing against a third fixed roller bearing to maintain said circular cam and said shaping cam in contact with their respective roller bearings as said workpiece carrying element rotates, further including forming said complementary cam including:

mounting a rough or unfinished cam member in place of said complementary cam on said sleeve;

replacing said third roller bearing with biased cutting means bearing against said unfinished cam and having a stop cutting position corresponding to the contact position between said complementary cam and its roller;

disabling said template and template follower means; and rotating said carrying element until said cutting means reaches said stop cutting position to finish said complementary cam.

* * * * *